(12) United States Patent
Ashtiani

(10) Patent No.: US 7,382,102 B2
(45) Date of Patent: Jun. 3, 2008

(54) HEATING OF BATTERIES USING REACTIVE POWER

(75) Inventor: Cyrus N. Ashtiani, West Bloomfield, MI (US)

(73) Assignee: Chrysler LLC, Auburn Hills, MI (US)

(*) Notice: Subject to any disclaimer, the term of this patent is extended or adjusted under 35 U.S.C. 154(b) by 98 days.

(21) Appl. No.: 11/423,930

(22) Filed: Jun. 13, 2006

(65) Prior Publication Data

US 2006/0290325 A1    Dec. 28, 2006

Related U.S. Application Data

(60) Provisional application No. 60/689,853, filed on Jun. 13, 2005.

(51) Int. Cl.
*H02P 1/00* (2006.01)
(52) U.S. Cl. ...................................... 318/139; 318/801
(58) Field of Classification Search ................ 318/139, 318/801; 361/90; 307/10.7
See application file for complete search history.

(56) References Cited

U.S. PATENT DOCUMENTS

| | | | |
|---|---|---|---|
| 4,222,000 A | 9/1980 | Silvertown et al. | |
| 4,309,622 A | 1/1982 | Cottrell | |
| 4,491,779 A | 1/1985 | Campbell et al. | |
| 5,291,388 A | 3/1994 | Heinrich | |
| 5,362,942 A | 11/1994 | Vanderslice, Jr. et al. | |
| 5,488,283 A | 1/1996 | Dougherty et al. | |
| 5,552,980 A | 9/1996 | Garces et al. | |
| 5,710,699 A | 1/1998 | King et al. | |
| 5,760,488 A | 6/1998 | Sonntag | |
| 5,808,469 A | 9/1998 | Kopera | |
| 5,824,432 A | 10/1998 | Currle | |
| 5,831,514 A | 11/1998 | Hilpert et al. | |
| 5,956,241 A | 9/1999 | LoCascio | |
| 6,054,842 A | 4/2000 | Verzwyvelt et al. | |
| 6,331,365 B1 | 12/2001 | King | |
| 6,710,574 B2 | 3/2004 | Davis et al. | |
| 6,741,482 B2 | 5/2004 | Yamamoto et al. | |
| 6,882,061 B1 | 4/2005 | Ashtiani et al. | |
| 2005/0094339 A1* | 5/2005 | Okui et al. | 361/90 |

* cited by examiner

*Primary Examiner*—Karen Masih
(74) *Attorney, Agent, or Firm*—Ralph E. Smith

(57) ABSTRACT

A circuit and method are provided for allowing self-heating of a battery used to power an AC motor by way of connection to a DC to AC inverter circuit. The inverter is selectively controlled to generate a heating mode AC current at the DC side connection to the battery, wherein the heating mode AC current is formed substantially of only a reactive AC current component and substantially no DC current component. In accordance with another aspect, the heating mode AC current is generated to fill the idle time in the operation of the battery.

12 Claims, 3 Drawing Sheets

HEATING OF BATTERIES USING REACTIVE POWER

RELATED APPLICATION(S)

This application claims the benefit of Provisional Application Ser. No. 60/689,853, filed Jun. 13, 2005, which is incorporated by reference herein

BACKGROUND OF THE INVENTION

1. Field of the Invention

The present invention generally relates to advanced batteries such as used in electric vehicles (EVs) end hybrid-electric vehicles (HEVs), and more particularly, to an arrangement for internally heating such batteries for optimal use in cold climates.

2. Background Art

Generally, most electrochemical batteries, including lead acid, NiCd, NiMH, Li-Ion, or Li-Polymer, require some form of heating when used by electric, hybrid-electric, or conventional vehicles in cold climate conditions before the batteries are capable of providing full power. Traditionally, known methods of warming a vehicle battery included using an external heat generating source, such as a heated jacket or a block heater, to externally apply heat to the battery. Unfortunately, such approaches have not proven to be satisfactory because the amount of energy expended to generate the heat is relatively high compared to the small increase in the internal temperature of the battery.

In addition in hybrid-electric vehicles (HEVs), battery packs have been warmed (when being operated in subfreezing temperatures) via a battery charging process. For example, the vehicle's internal combustion (IC) engine (e.g., gas or diesel) is operated to drive an electric motor in a "generator mode" and a motor inverter in a "rectifier mode" so that the battery is charged based on energy from the IC engine. Since the impedance of the battery rises considerably in an extremely cold climate condition, the flow of electrical current through the battery as a result of the charging process inherently creates a heat byproduct capable of warming the battery internally. Such an approach will not work with electric vehicles (EVs) because of the absence of an additional power source on the vehicle.

U.S. Pat. No. 6,882,061, entitled "Battery Self-Warming Mechanism Using the Inverter and Battery Main Disconnect Circuitry" and incorporated by reference herein, discloses a battery heating arrangement that provides significant improvement over such known approaches. More specifically, the '061 patent discloses a switching arrangement that allows the output current of a DC to AC inverter circuit to be selectively directed to either an electric motor (to power the motor) or to a center tap located between battery cells (to allow the AC current to internally heat the battery). The present invention seeks to provide further improvement over such arrangements.

SUMMARY OF THE INVENTION

Therefore, in accordance with one aspect of the present invention, an apparatus is provided for heating a battery such as used for powering a vehicle, wherein the apparatus includes an inverter circuit electrically connected to an electric motor and the battery for generating an AC output based on a DC input from the battery, and a controller arranged to selectively control the inverter circuit to generate a heating mode AC current at the connection to the battery. The heating mode current includes a reactive AC electric current component and substantially no DC electrical current component, and when received by the battery, the heating mode AC current will cause the battery to internally self-heat.

In accordance with another aspect of the present invention, a circuit is provided for powering an electric motor, the circuit including an inverter circuit electrically connected to the electric motor on an AC side of the inverter circuit, and a battery on a DC side of the inverter circuit, and a controller arranged to selectively control the inverter circuit to generate a heating mode AC current at the DC side. The heating mode current includes a reactive AC electric current component and substantially no DC electrical current component, wherein when the heating mode AC current is present on the DC side, the heating mode current will cause the battery to internally self-heat.

In accordance with yet another aspect of the present invention, a method is provided for self-heating a battery used to power an AC motor by way of connection to a DC to AC inverter circuit, wherein the method includes determining temperature conditions indicative of a need to heat the battery, controlling operation of the DC to AC inverter circuit so as to produce a heating mode AC current at the connection to the battery, the heating mode AC current comprising substantially only a reactive AC current component and substantially no DC current component, and supplying the heating mode AC current to the battery until a desired internal battery temperature is reached.

The present invention will be more fully understood upon reading the following detailed description of the preferred embodiment(s) in conjunction with the accompanying drawings.

DETAILED DESCRIPTION OF THE PREFERRED EMBODIMENT(S)

Figure 1:
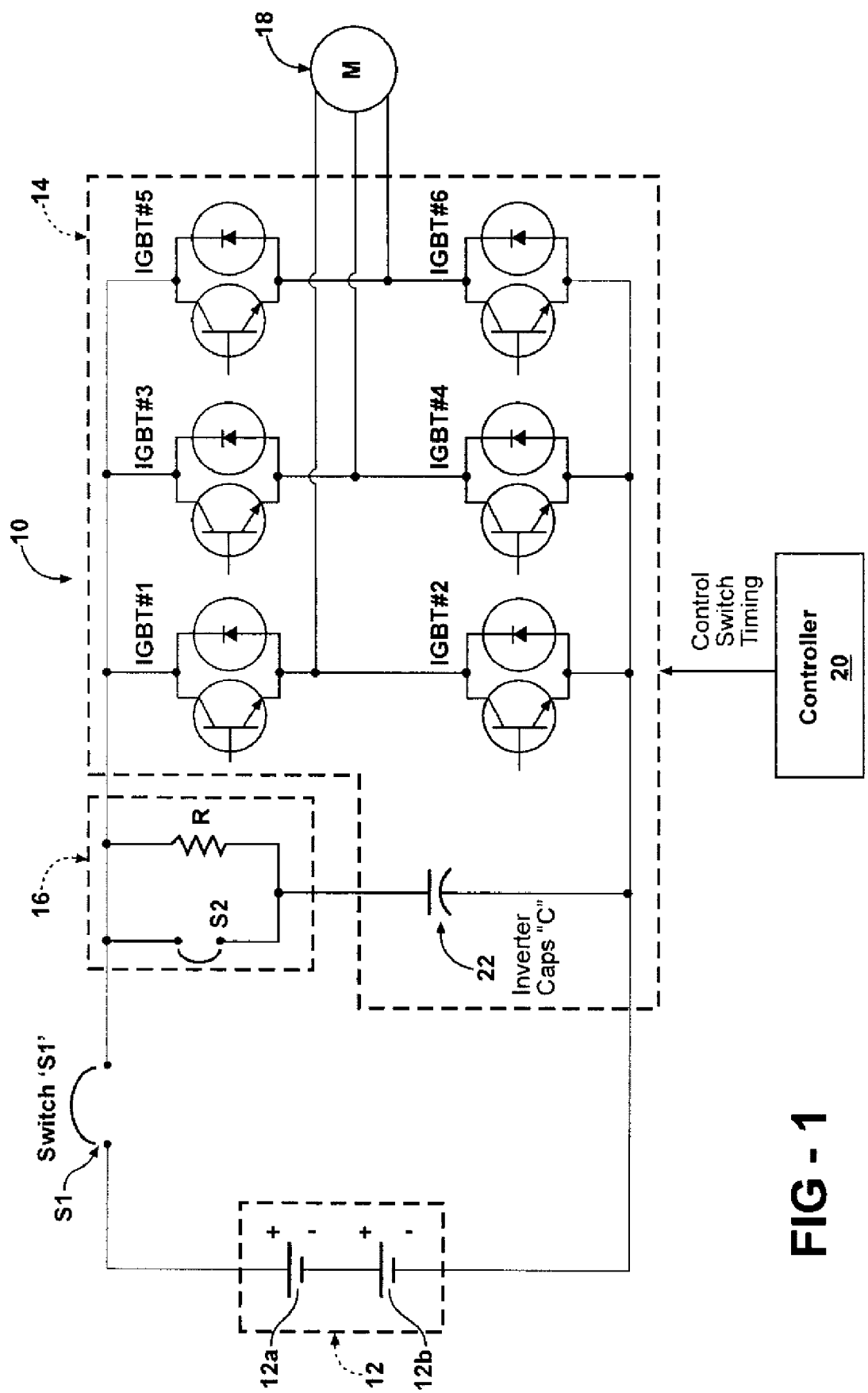
FIG. 1 is an electrical power circuit for a vehicle having a warming circuit in accordance with an exemplary embodiment of the present invention.

Referring to FIG. 1, an electrical power circuit 10 in accordance with an exemplary embodiment of the present invention includes a battery pack 12 connected to an inverter circuit 14 (shown in the exemplary embodiment as a three phase DC to AC inverter) by way of a pre-charge circuit 16 and a main disconnect switch S1. In the exemplary embodiment, power circuit 10 is particularly suited for controlling the power distribution between a multi-cell battery pack 12 and a three-phase AC motor and generator unit 18 sized to provide or assist in providing propulsion or starting of the engine for an electric or hybrid-electric vehicle. Battery pack 12 can include multiple cells depicted as a first battery cell 12(a) and a second battery cell 12(b) having a common node formed therebetween. Each battery cell within battery pack 12 may include one or more individual energy storage devices or cells, and may also be chosen from a wide variety of battery technologies.

Main disconnect switch S1 can include a switching element connected between a positive terminal of battery pack 12 and a first node of the inverter circuit 14. The negative terminal of the battery pack 12 is connected a second node of the inverter circuit 14, In the exemplary embodiment, the inverter 14 is arranged to provide a three phase AC electric power output and includes first, second, and third inverter branches arranged to generate the three phase AC power output. The precharge circuit 16 is series connected with a capacitor 22 between the first and second nodes of the inverter circuit, Inverter circuit 14 includes a set of switching devices, such as a set of insulated gate bipolar transistors (IGBTs) Nos.1-6 each having an associated anti-parallel diode connected in parallel with the transistor. However, it will be appreciated that the present invention may be extended to the use of other switching devices such as MOSFET's, BJT's, and MOT's. Inverter circuit 14 operates as a DC to AC Inverter for generating an alternating current by appropriately switching the transistors between a conducting and nonconducting state via a controller 20 coupled to the inverter circuit.

As explained more fully below, in accordance with the present invention controller 20 is arranged by way of suitable hardware and programming to control and adjust the timing by which the inverter switches/transistors are switched on and off (i.e., "fired") to control frequency, pulse duration, and voltage recovery to generate a heating mode electric current in which "active" and "reactive" components of the inverter 16/motor 18 create an electrical current on the DC side of the inverter having only a reactive AC current component (in the form of high frequency harmonics) and zero or substantially zero DC current portion. With such an arrangement, the harmonic AC current on the DC side of the inverter can be fed back to internally self-heat the battery pack 12.

More specifically, at an extreme portion of the profile of the electric current generated by battery pack 12, the controller 20 controls the inverter switch firing to create a 90 degree phase shift between voltage and current waveforms on the AC output side of inverter 14. In such a condition, practically all the electrical power at the inverter output will be reactive. This means that on the DC side of inverter 14, which is connected to the battery, the DC component of the current is substantially zero or very small. Thus, only high frequency harmonics of the AC current flow on the DC side connected to battery pack 12. When supplied to battery pack 12, these high frequency harmonics will operate to cause the battery(ies) to internally self-heat. To prevent the AC electrical current harmonics from shorting any inverter capacitors (i.e., "caps"), the self-heating operation of the present invention is selectively controlled to occur during operation of the precharge circuit 16 in which S1 is closed, S2 is open, and a resistance R is in the path.

Figure 2A:
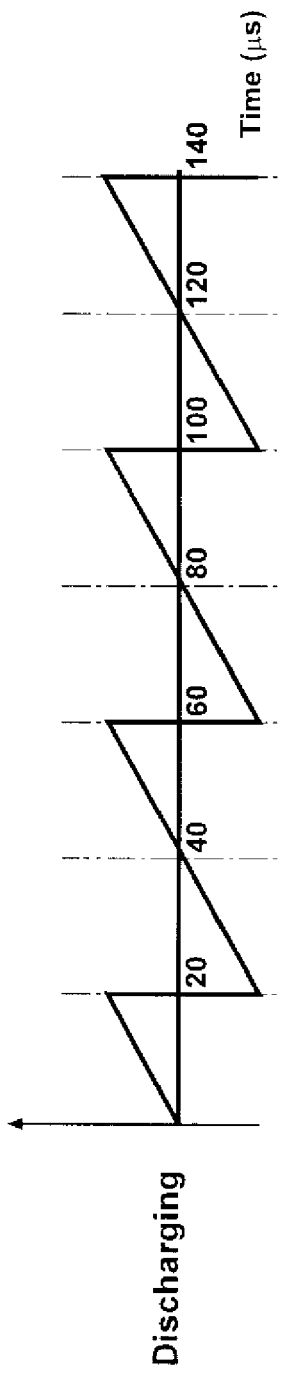
FIGS. 2A-2C are graphs showing the plots of battery current waveforms illustrating the relationship of the creation of losses to control use of the battery current.
Figure 2B:
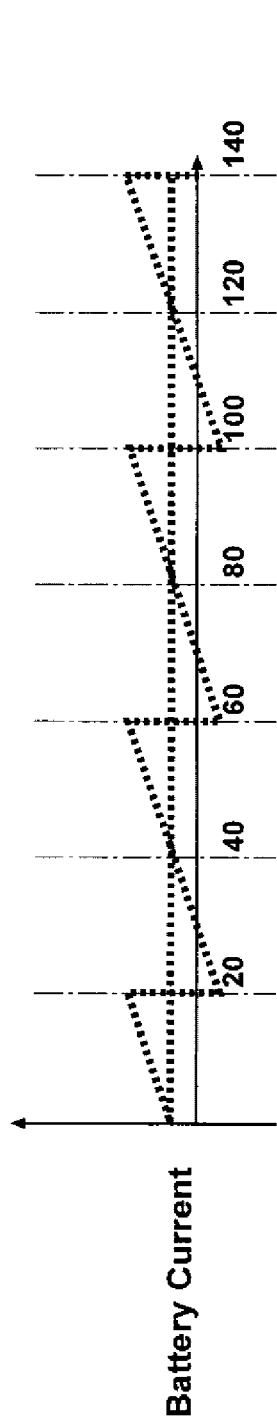

Operation will now be explained in connection with FIGS. 2 and 3. In these figures positive current indicates battery discharging and negative current indicates charging. Referring to FIG. 2A, a plot of the ideal battery current over time during circuit operation illustrates that the average battery current will equal zero if there are effectively no losses. Under these conditions, there is no internal heating of the battery. As shown in FIG. 2B, if operation of the inverter switches (in combination with the inductance of motor 18 or alternatively a 3-phase high frequency inductor) is controlled to create only internal losses in the battery, then the energy of the battery will only operate to internally self-heat the battery and a small DC component will be observed in the battery current waveform.

Figure 2C:
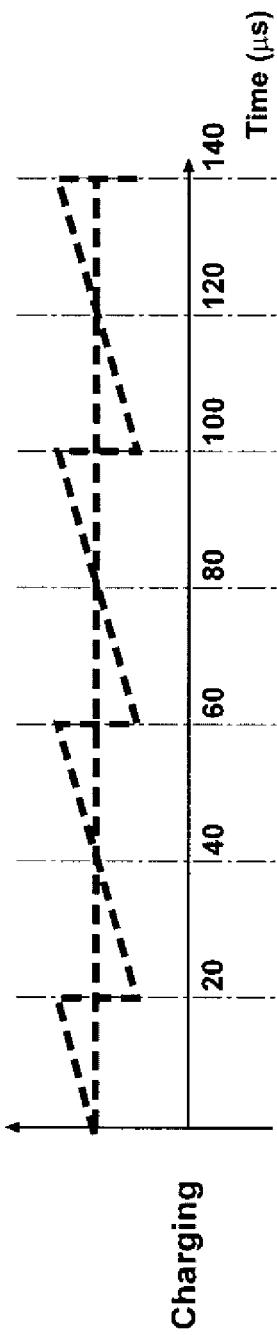
Figure 3A:
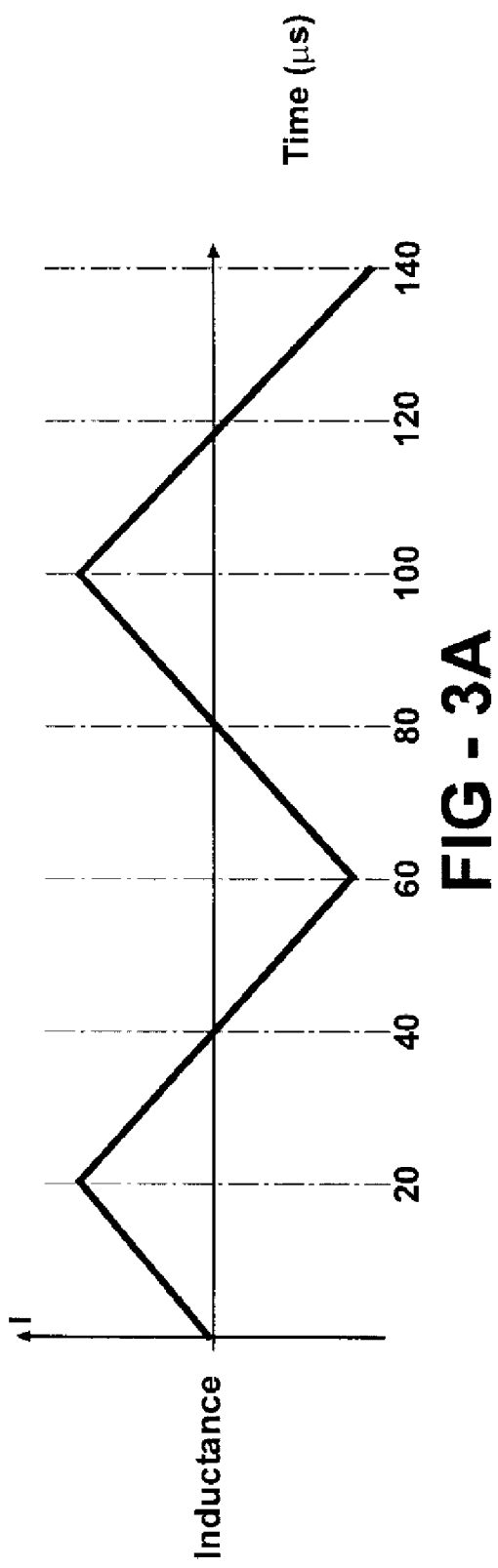
FIGS. 3A and 3B are graphs respectively showing the plot of inductance (reactive AC circuit component) and battery current waveforms to illustrate filling of idle periods in battery use to allow for self heating of the battery in accordance with the present invention.
Figure 3B:
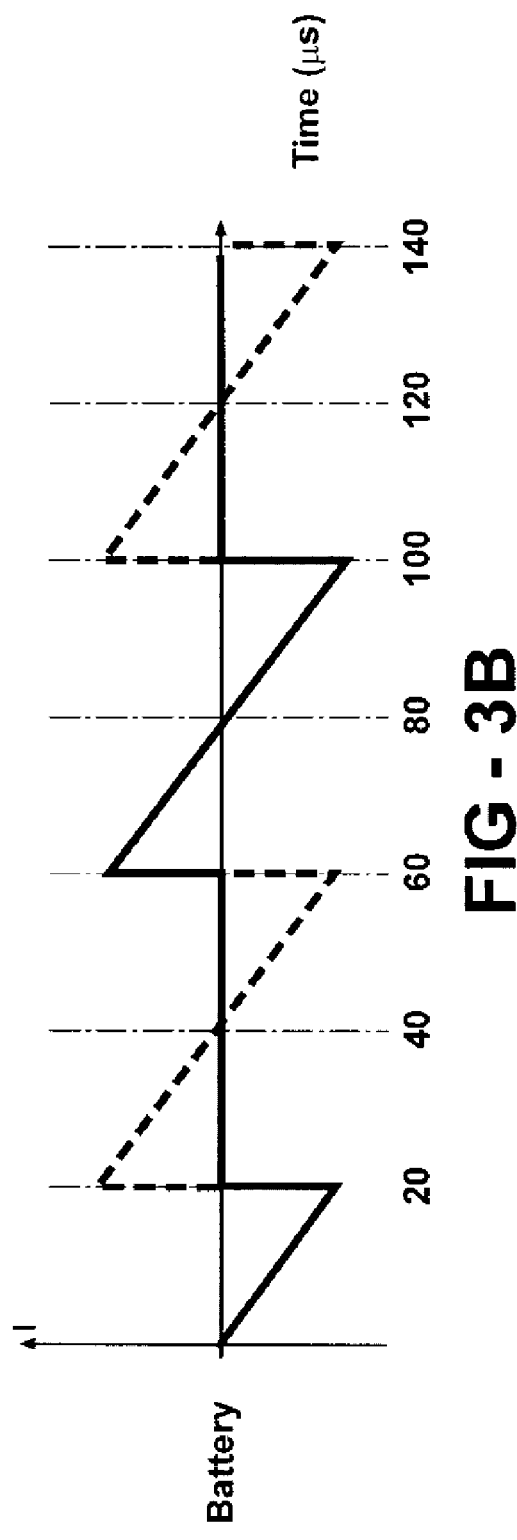

Finally, as shown in FIG. 2C, if the Inverter switches (in combination with the inductance of motor 18) are controlled to create significant external power such as required to drive the electric motor 18, then energy of the battery will mostly be available to operate the inverter. Thus, the average battery current is a function of internal losses and external loads. As shown in FIGS. 3A and B, in accordance with the present invention, idle periods in the battery current profile experienced in the prior art during battery preheating are filled by generating the heating mode current. This is illustrated as the reactive AC current component (dashed line of FIG. 3B) and no DC current component (solid line in FIG. 3B). This "filling" operation thereby significantly improves the time necessary to preheat the battery by eliminating the idle periods, and does so with normal inverter hardware and without need for a center tap structure on the battery. Further, because the present invention allows more effective selfheating without the need for a center tap, a more streamlined design of the battery packs can be achieved.

Thus, the present invention also provides a method for self-heating a battery used to power an AC motor by way of connection to a DC to AC inverter circuit that includes determining the existence of temperature conditions (such as subzero degree Celsius) indicative of a need to heat the battery, and entering heating (or preheating) mode by controlling operation of the DC to AC inverter circuit so as to produce the heating mode AC current at the connection to the battery. As discussed above, the heating mode AC current consists substantially of only a reactive AC current component and substantially no DC current component. The heating mode AC current is then supplied to the battery until a desired internal battery temperature is reached. The supply of the heating mode AC current is advantageously carried out to fill the idle times in the operation of the battery.

While one or more embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. Apparatus for heating a battery used for providing electrical power to a vehicle, the apparatus comprising:
   an inverter circuit electrically connected to an electric motor and the battery for generating an AC output based on a DC output from the battery; and
   a controller arranged to selectively control the inverter circuit to generate a heating mode AC current at the connection to the battery, the heating mode current comprising a reactive AC electric current component and substantially no DC electrical current component, wherein when received by the battery, the heating mode AC current will cause the battery to internally self-heat.

2. The apparatus of claim 1 wherein the controller is arranged to cause the inverter circuit to generate the heating mode AC current during an idle time in the operation of the battery.

3. The apparatus of claim 1 wherein the battery comprises a series connection of a plurality of battery cells, wherein the inverter circuit is connected to the plurality of battery cells without a center tap.

4. The apparatus of claim 1 wherein the inverter circuit comprises a capacitor connected across the connection to the battery, the apparatus further comprising a switch arrangement connected in series with capacitor, the switch arrangement being controlled to be open when the inverter is generating the heating mode AC current to prevent the capacitor from being shorted by the heating mode AC current.

5. A circuit for powering an electric motor comprising:
an inverter circuit electrically connected to the electric motor on an AC side of the inverter circuit, and a battery on a DC side of the inverter circuit; and
a controller arranged to selectively control the inverter circuit to generate a heating mode AC current at the DC side comprising a reactive AC electric current component and substantially no DC electrical current component, wherein when the heating mode AC current is present on the DC side, the heating mode current will cause the battery to internally self-heat.

6. The circuit of claim 5 wherein the controller is arranged to cause the inverter circuit to generate the heating mode AC current during an idle time in the operation of the battery.

7. The circuit of claim wherein the battery comprises a series connection of a plurality of battery cells, wherein the inverter circuit is connected to the plurality of battery cells without a center tap.

8. The circuit of claim 5 wherein the inverter circuit comprises a capacitor connected across the DC side, the circuit further comprising a switch arrangement connected in series with capacitor, the switch arrangement being controlled to be open when the inverter is generating the heating mode AC current to prevent the capacitor from being shorted by the heating mode AC current.

9. A method for self-heating a battery used to power an AC motor by way of connection to a DC to AC inverter circuit, the method comprising:
determining temperature conditions indicative of a need to heat the battery;
controlling operation of the DC to AC inverter circuit so as to produce a heating mode AC current at the connection to the battery, the heating mode AC current comprising substantially only a reactive AC current component and substantially no DC current component; and
supplying the heating mode AC current to the battery until a desired internal battery temperature is reached.

10. The method of claim 9 further comprising controlling the generation of the heating mode AC current so as to be timed to be supplied to the battery during an idle time in the operation of the battery.

11. The method of claim 9 wherein the battery comprises a series connection of a plurality of battery cells, and the method includes connecting the inverter circuit to the plurality of battery cells without a center tap.

12. The method of claim 9 wherein a capacitor is connected across the connection of the inverter circuit to the battery, the method further comprising protecting the capacitor from being shorted by the heating mode AC current by opening the connection to the capacitor.

* * * * *